Figure 1:
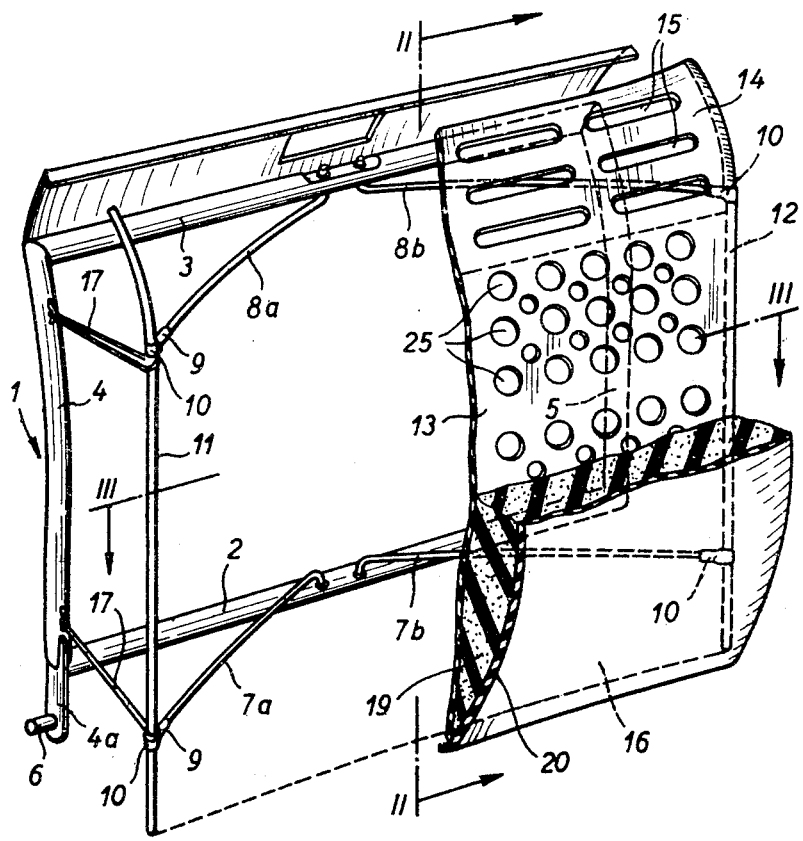

Oct. 23, 1962 P. MARCHINO 3,059,919
RESILIENT VEHICLE SEAT STRUCTURE
Filed April 12, 1961 2 Sheets-Sheet 1

Oct. 23, 1962 P. MARCHINO 3,059,919
RESILIENT VEHICLE SEAT STRUCTURE
Filed April 12, 1961 2 Sheets-Sheet 2

3,059,919
RESILIENT VEHICLE SEAT STRUCTURE
Piero Marchino, Turin, Italy, assignor to Fiat Societa per
Azioni, Turin, Italy
Filed Apr. 12, 1961, Ser. No. 102,545
Claims priority, application Italy Sept. 27, 1960
1 Claim. (Cl. 267—103)

This invention relates to a spring vehicle seat structure useful in springing both the back and cushion.

This invention provides a structure which is simple in construction and inexpensive, of low weight and highly comfortable.

The main characteristic feature of this invention resides in the fact that the structure comprises a rigid base frame and a further deformable frame floatingly mounted on the base frame, the further frame comprising two end rods between which a flat structure is stretched, which is made in part at least of rubber or the like, is highly flexible and resilient and acts as a backing for the upholstery.

Figure 2:
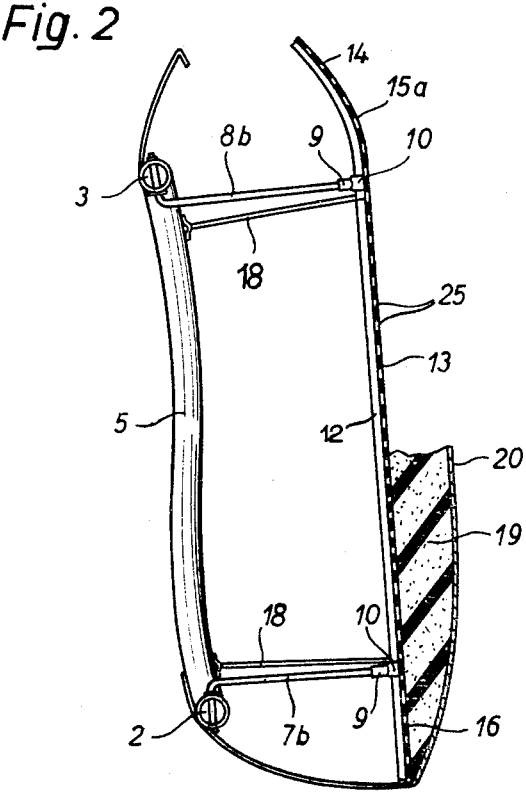
Figure 3:
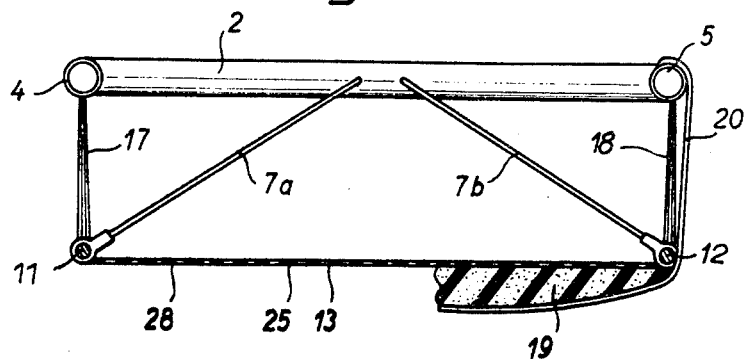

Further characteristic features and advantages of this invention will be understood from the appended description referring to the accompanying drawing which shows diagrammatically by way of a non limiting example a construction thereof. On the drawing:

FIG. 1 is a perspective view of the resilient structure of a vehicle seat back, FIGURES 2 and 3 being sectional views thereof on lines II—II and III—III of FIG. 1.

1 denotes a rigid base frame of substantially rectangular shape, comprising two horizontal bottom and top members 2, 3, respectively, and vertical members 4 and 5.

The members 4 are formed in a known manner with extensions 4a carrying hinge pins 6 for attachment to the rigid seat structure.

The above described frame and its connection to the general seat structure do not form part of this invention and can be of any known type.

The members 2 and 3 of the frame 1 have diverging pairs of arms 7a, 7b and 8a, 8b hinged thereto at their intermediate portion about axes parallel with the sides 4 and 5 of the base frame.

The arms 7a, 7b and 8a, 8b can be made of metal rods of circular cross section having their inner ends bent at about 90° to act as hinge pins engaged by holes bored in the members 2 and 3.

Sleeves 9 are secured to the outer ends of the arms 7a, 7b, 8a, 8b and carry a sleeve 10 extending perpendicular to the axis of the said arms.

Metal rods 11, 12 engage within the sleeves 10 carried by the arms 7a, 8a, and 7b, 8b, respectively. The rods 11, 12 extend parallel with the sides 4 and 5 of the rigid frame, their profile matching the profile of the outer seat back face.

A sheet of highly resilient rubber 13 is stretched between the rods 11 and 12 and has holes 25 therethrough which are adapted to both improve its elasticity and make it air permeable, the rubber sheet 13 being formed towards the back top with a rubber portion 14 of higher rigidity in which elongated holes 15 are cut.

An unperforated portion 16 of higher rigidity is provided at the bottom of the sheet 13.

The rod 11 is attached to the side 4 of the base frame by flexible non extensible straps 17 extending from the hinge points of the arms 8a, 7a substantially perpendicular to the surface of the sheet 13, the rod 12 being similarly attached to the side 5 of the frame by means of straps 18.

The back upholstery 19, which can be made of sponge rubber or equivalent material, is arranged on the sheet 13, 14, 16 and is covered as usual with fabric 20 which is secured to the base frame 1. In use the rods 11, 12 and their rubber sheet 13, 14, 16 act as a deformable floating frame with respect to the rigid base frame 1. Under the action of the load on the rubber sheet, the latter yields resiliently, the rods 11, 12 suiting the distribution of load by virtue of their articulated connections to the base frame.

In the absence of load the said frame takes a position parallel with the base frame plane by virtue of the prestress of the rubber sheet 13, 14, 16 on the rods 11, 12, and holds the straps 17 taut.

The straps comprise, for intance, non extensible cords, chains or the like.

What I claim is:

In a vehicle seat a rigid frame of substantially rectangular shape, a pair of diverging arms hingedly connected to the middle portion of each of the opposite sides of said rectangular base frame, the arms in each pair being situated on either side of a common plane perpendicular to said arm carrying sides of the base frame, a pair of rods, each rod being secured to the free ends of two of said arms situated on the same side of said common plane, a sheet of resilient material stretched between said pair of rods, a plurality of non-extensible, flexible straps disposed between each of said rods and the base frame, whereby limiting the movement of said hinged arms away from the base frame.

References Cited in the file of this patent
FOREIGN PATENTS

| 530,394 | Great Britain | Dec. 11, 1940 |
| 209,325 | Australia | Nov. 28, 1956 |
| 1,135,133 | France | Dec. 10, 1956 |